(12) United States Patent
Hoyt et al.

(10) Patent No.: US 6,523,034 B1
(45) Date of Patent: Feb. 18, 2003

(54) METHOD FOR INCREASING TRAFFIC ON AN ELECTRONIC SITE OF A SYSTEM OF NETWORKED COMPUTERS

(75) Inventors: Timothy Hoyt, Miami, FL (US); David Foster, Coral Gables, FL (US)

(73) Assignee: Photerra Inc., Miami, FL (US)

( * ) Notice: Subject to any disclaimer, the term of this patent is extended or adjusted under 35 U.S.C. 154(b) by 0 days.

(21) Appl. No.: 09/289,851

(22) Filed: Apr. 12, 1999

Related U.S. Application Data

(63) Continuation-in-part of application No. 09/089,272, filed on Jun. 2, 1998, now abandoned, which is a continuation-in-part of application No. 09/089,273, filed on Jun. 2, 1998, now abandoned, which is a continuation-in-part of application No. 09/089,244, filed on Jun. 2, 1998, now Pat. No. 6,085,195.
(60) Provisional application No. 60/048,539, filed on Jun. 3, 1997.

(51) Int. Cl.[7] .............................................. G06F 15/00
(52) U.S. Cl. ...................... 707/10; 707/102; 707/513; 709/201; 709/217; 709/249; 709/250; 396/2
(58) Field of Search ........................ 707/10, 102, 513; 709/201, 217, 249, 250; 396/2

(56) References Cited

U.S. PATENT DOCUMENTS

| | | |
|---|---|---|
| 5,539,453 A | 7/1996 | David et al. |
| 5,574,511 A | 11/1996 | Yang et al. |
| 5,587,740 A | 12/1996 | Brennan |
| 5,623,581 A | 4/1997 | Attenberg |
| 5,696,995 A | 12/1997 | Huang et al. |
| 5,761,071 A | 6/1998 | Bernstein et al. |
| 5,781,909 A * | 7/1998 | Logan et al. ................ 707/200 |
| 5,812,765 A | 9/1998 | Curtis |
| 5,818,446 A | 10/1998 | Bertram et al. |
| 5,826,267 A | 10/1998 | McMillan |
| 5,897,220 A | 4/1999 | Huang et al. |
| D410,481 S | 6/1999 | Roncal |
| 5,913,019 A * | 6/1999 | Attenberg .................... 395/117 |
| 5,940,834 A | 8/1999 | Pinard et al. |
| 5,949,411 A | 9/1999 | Doerr et al. |
| 6,009,429 A | 12/1999 | Greer et al. |
| 6,085,195 A | 7/2000 | Hoyt et al. |
| 6,167,469 A * | 12/2000 | Safai et al. .................. 345/733 |
| 6,194,992 B1 * | 2/2001 | Short et al. .................. 340/5.9 |
| 6,353,848 B1 * | 3/2002 | Morris ........................ 709/200 |

FOREIGN PATENT DOCUMENTS

| | | | | |
|---|---|---|---|---|
| JP | 02000207338 A | * | 7/2000 | ........... G06F/13/00 |
| JP | 02001243145 A | * | 9/2001 | ........... G06F/13/00 |

OTHER PUBLICATIONS

Christian et al., "Digital smart kiosk project," *CHI '98 Human Factors in Computing Systems*, ACM, vol. 2, abstract only, (1998).
Meade, P., "Cyberbooths: the new payphone?," *America's Network*, vol. 101, No. 11, abstract only, (1997).

\* cited by examiner

*Primary Examiner*—Jean R. Homere
(74) *Attorney, Agent, or Firm*—Townsend and Townsend and Crew LLP

(57) ABSTRACT

The present invention provides a method for increasing traffic on an electronic site, e.g., Web site. In particular, the method increases a quantity of users to an electronic on-line messaging site from off-line traffic. The method includes capturing user information from a public media transmitting device, which is coupled to a wide area network of computers. The method also outputs an address location to a user of the communication function through the public media transmitting device. The method also accesses the address location through one of the plurality of a computers. Accordingly, the present method increases on-line traffic using off-line traffic.

25 Claims, 9 Drawing Sheets

METHOD FOR INCREASING TRAFFIC ON AN ELECTRONIC SITE OF A SYSTEM OF NETWORKED COMPUTERS

CROSS-REFERENCES TO RELATED APPLICATION

This application is a continuation-in-part of application Ser. No. 09/089,272, filed Jun. 2, 1998, now abandoned, application Ser. No. 09/089,273, filed Jun. 2, 1998, now abandoned, and application Ser. No. 09/089,244, filed Jun. 2, 1998, now U.S. Pat. No. 6,085,195 which are all continuations of Provisional Application Serial No. 60/048,539, filed Jun. 3, 1997, all in the name of the present assignee, and all hereby incorporated by reference for all purposes.

The following two commonly-owned co-pending applications, including this one, are being filed concurrently and the other one is hereby incorporated by reference in their entirety for all purposes:

1. U.S. patent application Ser. No. 09/289,852, in the name of Hoyt, et al., titled, "A System For Increasing Traffic On An Electronic Site Of A System Of Networked Computers,"; and
2. U.S. patent application Ser. No. 09/289,851, in the name of Hoyt, et al., titled, "A Method For Increasing Traffic On An Electronic Site Of A System Of Networked Computers."

BACKGROUND OF THE INVENTION

The present invention relates generally to increasing traffic on an electronic site of a system of networked computers. More particularly, the present invention provides a technique including a method and system for increasing a number of users to a selected electronic messaging site by way of personalized user information. The invention will generally be illustrated using a wide area network of computers such as the Internet, but it should be recognized that the invention has a much broader range of applicability. For example, the invention can be applied to other types of networks where a physical geographic location is coupled to an electronic medium.

Merchants have always attempted to find ways to lure shoppers to their stores, establishments, and the like, which are often fixed in physical space (e.g., stores, open markets) at a specific geographic location. In particular, merchants placed advertisements in daily newspapers to lure these shoppers to their stores. Merchants also provided shoppers' with coupons, special discounts, and bonus points as ways to attract shoppers. In some cases, merchants have even provided special events such as live music, carnivals, magicians, celebrities, and the like as other ways of luring shoppers. Free products such as food, novelty items, and the like have also been used to lure shoppers to the merchant's place. All of these ways have been somewhat successful with conventional merchants that provide their goods or services for display at a physical location.

Shoppers are now using computers for purchasing goods, which are delivered to the shopper's home. In particular, shoppers are purchasing goods and even services from merchants using a world wide area network of computers, commonly known as the Internet. The Internet is an international "super-network" connecting together millions of individual computer networks and computers, workstations, and the like. Although the Internet is widely know for one of its ways of presenting information through the World Wide Web (herein "Web"), there are many other services currently available based upon the general Internet protocols and infrastructure.

The Web is generally easy to use for people with little knowledge about computers. Information on the Web can be presented on electronic "pages" made of graphics and text that contain "links" to other pages either within the same set of data files (i.e., Web site) or within data files located on other computer networks. Users often access information on the Web using a "browser" program. The browser program processes information from Web sites and displays the information using graphics, text, sound, and animation. Accordingly, the Web has become a popular medium for advertising goods and services directly to shoppers.

With the increasing popularity of the Internet, many merchants have flocked to it in an attempt to sell goods and services using an electric medium in the form of the Web site, which can be accessed by computers that are coupled to each other over a wide area network, i.e., Internet. As merely an example, a potential purchaser of a text book can now purchase such book using a service on the Internet from a company called Amazon.com in Seattle, Wash., as well as others. Customers can also purchase goods from auction houses such as those called eBay.com of California and others. Although some success has been achieved using the electronic medium, many drawbacks still exist.

For example, electronic Web pages are often easy to create so electronic Web sites on the Internet have increased dramatically in quantity. Accordingly, it is increasingly more difficult for merchants to lure potential customers to their Web sites because of the sheer number and complexity of Web sites. Additionally, merchants have had difficulty building goodwill and/or awareness of their Web sites, also due to the sheer number of Web sites. In some cases, there are so many Web sites that it is almost impossible or impractical to identify a good to be purchased even with conventional search engines, which often find thousands of potential sites to visit. Accordingly, it would be desirable to find a way to lure a potential user to a selected Web site in a more targeted manner. This limitation is also shared by non-merchant Web sites that seek to increase their viewership in order to increase their advertising revenues.

From the above, it can be seen that a more efficient way of increasing traffic to a selected Web site is highly desirable.

SUMMARY OF THE INVENTION

According to the present invention, a technique for increasing traffic to an electronic site is provided. In an exemplary embodiment, the present invention uses personalized information, which is placed on a Web site, to increase the number of users to the Web site. The personalized information is provided using one of a plurality of public media transmission devices, which are placed in commercial locations.

In a specific embodiment, the present invention provides a method for increasing traffic on an electronic site, e.g., Web site. In particular, the method increases a quantity (e.g., 3 or more, 4 or more, 5 or more) of users to an electronic on-line messaging site from off-line traffic. The method includes capturing user information (e.g., an image, a voice, a finger print, a retinal scan, a three dimensional scan, and a hologram) from a public media transmitting device, which is coupled to a wide area network of computers. The method also outputs an address location to a user of a communication function through the public media transmitting device. The method also accesses the address location through one of the plurality of a computers. Accordingly, the present method increases on-line traffic using off-line traffic.

In an alternative embodiment, the present invention provides a method for increasing a quantity of hits to a selected electronic messaging site such as a Web site. The method includes capturing user information from a user through a public media transmitting device, which is coupled to a wide area network of computers. The method also includes outputting an address location to the user of the communication function through the public media transmitting device. The method also includes accessing the address location through one of the plurality of a computers to use the user information. Some of the advantages of this method are shown below.

Numerous advantages exist using the present invention over conventional techniques. In one or more embodiments, the present invention provides an output that includes address information, which is easy to access since it can be in the form of a hard copy (e.g., photograph, card, lenticular lens card) or electronic mail. Accordingly, complex URL address locations need not be memorized but merely referenced on the hard copy or electronic mail by the user. The present invention also provides a hard copy or electronic copy that can be distributed to a wide number of potential users. This distribution allows a possibility of more potential users to access the electronic site. Furthermore, the electronic messaging site has personalized user information such as the user's photograph, which was captured by the public media device. The personalized information lures the user to the electronic messaging site. The present invention can also provide a single Web site, which has personalized information. This Web site can eventually become a community or the like for Web users, which further increases traffic to the Web site. Depending upon the embodiment, one or more of these advantages may be available.

These and other embodiments of the present invention, as well as its advantages and features, are described in more detail in conjunction with the text below and attached.

DESCRIPTION OF THE SPECIFIC EMBODIMENTS

Figure 1:
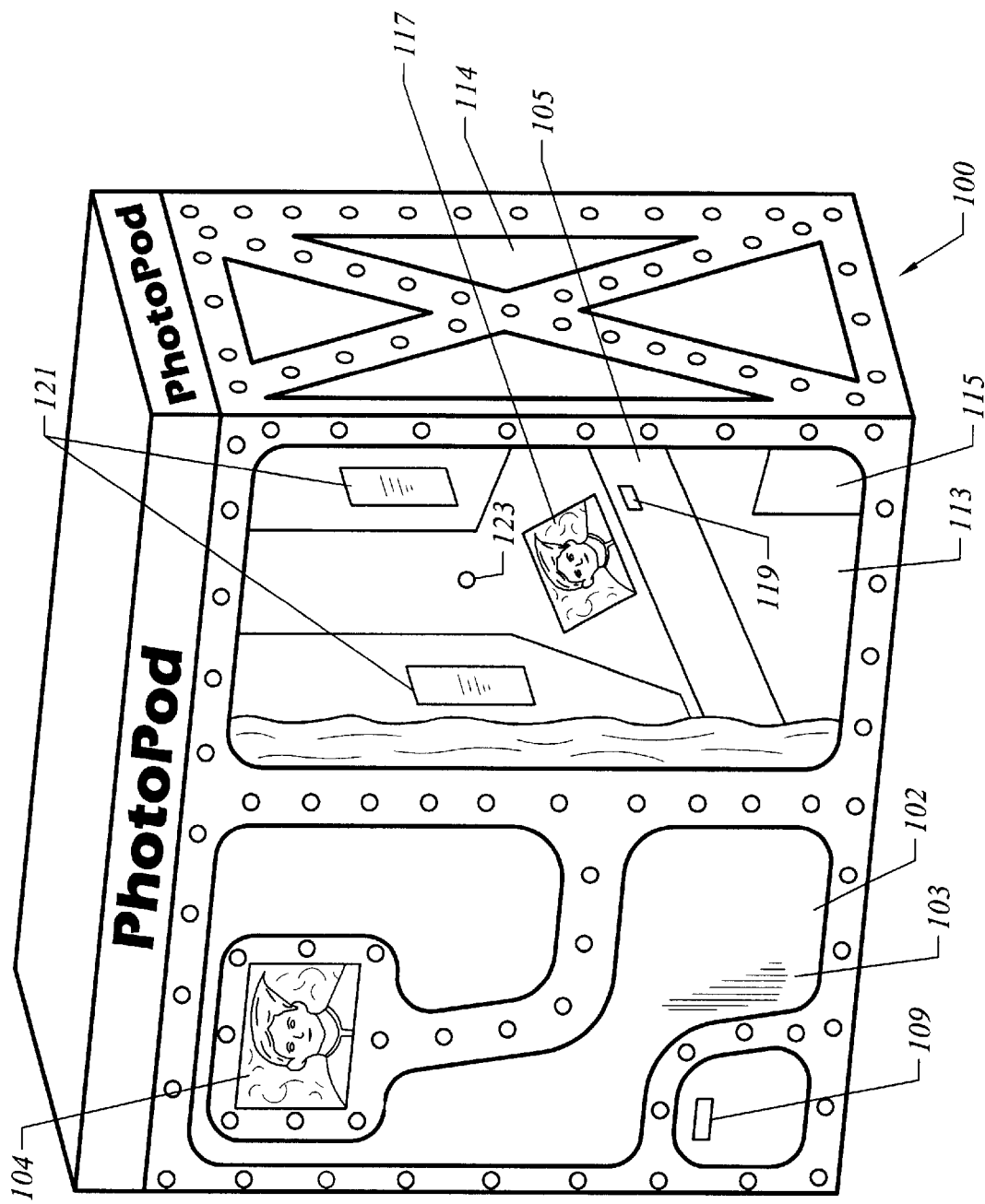
FIG. 1 is a simplified diagram of a public telecommunication device according to an embodiment of the present invention.

FIG. 1 shows a simplified outside view diagram a booth or kiosk 100 according to an embodiment of the present invention. The diagram is merely an illustration and should not limit the scope of the claims herein. One of ordinary skill in the art would recognize other variations, modifications, and alternatives. The booth includes a housing 101 or any suitable enclosure for holding various hardware and software elements, as well as a user(s). The enclosure is often made of a durable material that can withstand one or more human users and can also withstand a variety of environmental conditions or weather such as heat, moisture, and other types of weather or the like. The enclosure is often made of a material such as a combination of wood, metal, and synthetic materials such as plastic or the like. In some applications, the enclosure can also be made of a fiberglass type material. The enclosure is also capable of housing a human user or numerous human users that can use and even abuse the present booth according to aspects of the present invention.

The enclosure or booth includes a variety of element such as exterior region 103 and opening 105, which allows one or more users to enter or exit the booth. The opening is also large enough for handicapped users and alike. The external region is generally capable of being placed or installed easily at numerous locations without substantial fit-up costs. In most embodiments, the external region can be installed using conventional power and/or a telephone network line or lines. In some embodiments, the external region can also be installed to a wireless network. The exterior region has sides 102, including a backside 114. The external region has an external monitor 107 that displays or outputs a video and/or audio "teaser." The teaser is generally output that attracts people to use the booth. The booth also has a receptacle 109 for output, e.g., one or more photographs, stickers, or hard copies. In most embodiments, the output appears at the receptacle within three minutes or less, or two minutes or less, or one minute or less of capturing an image of the user or users in the booth.

In a specific embodiment, a user(s) enters an interior region 113 of the booth through the opening and performs one or more functions according to embodiments of the present invention. That is, the user sits or even stands on a bench 115, which can be wide and even upholstered. The bench faces a screen 117, which can be a display as well as a display in combination with a user interface, e.g., touch screen. The interior region also includes a vending card reader 119 (or bill, coin, or token receptacle), and lights 121 (e.g., one or two or more) which flash at various times including a time when a picture is taken of the user. The interior region also includes audio output devices such as, for example, a stereo sub-woofer 120, and stereo speakers 122, which can be implemented behind the user. The interior region also includes a camera 123, which captures images of the user or users. The camera 123 is often covered in a clear plastic or glass material for durability. The interior region also includes an area for electronic or computer hardware such as a central processing unit, which will be used to oversee the various operations in the booth.

Figure 2:
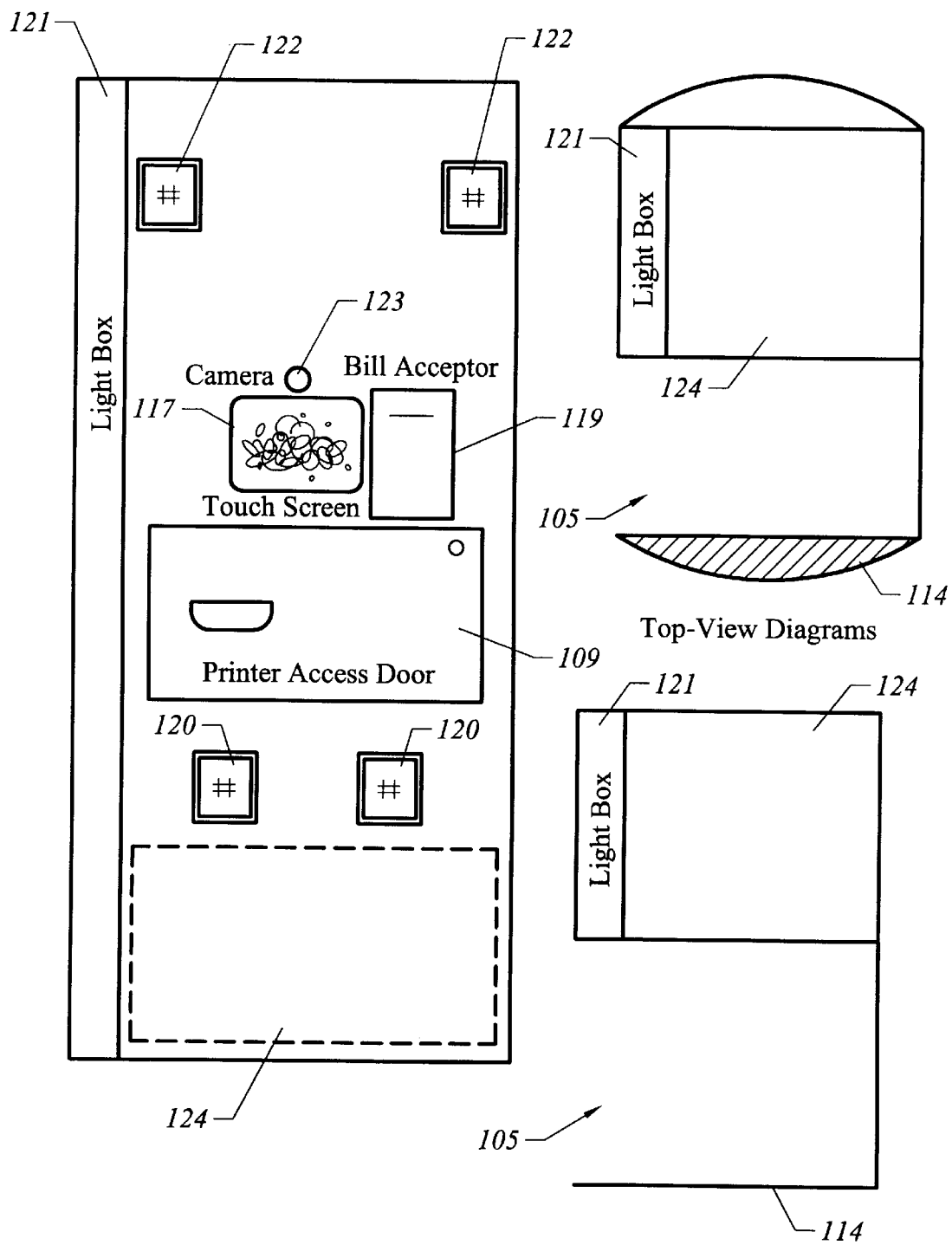
FIG. 2 is a simplified interior diagram of a booth according to an embodiment of the present invention.

FIG. 2 is a simplified interior diagram of a booth according to an embodiment of the present invention. The diagram is merely an illustration and should not limit the scope of the claims herein. Simplified top-view diagrams are also shown. One of ordinary skill in the art would recognize other variations, modifications, and alternatives. The interior diagram includes a variety of elements such as the display or display in combination with a touch screen. The interior region also includes vending card reader 119, and lights 121 (e.g., one or two or more) which flash at various times including a time when a picture is taken of the user. The interior region also includes audio output devices such as, for example, a stereo sub-woofer 120, and stereo speakers 122, which can be implemented behind the user. The interior region also includes camera 123, which captures images of the user or users. The camera 123 is often covered in a clear plastic or glass material for durability. The interior region also includes an area 124 for computer or electronic hardware, such as the central processing unit.

Figure 3:
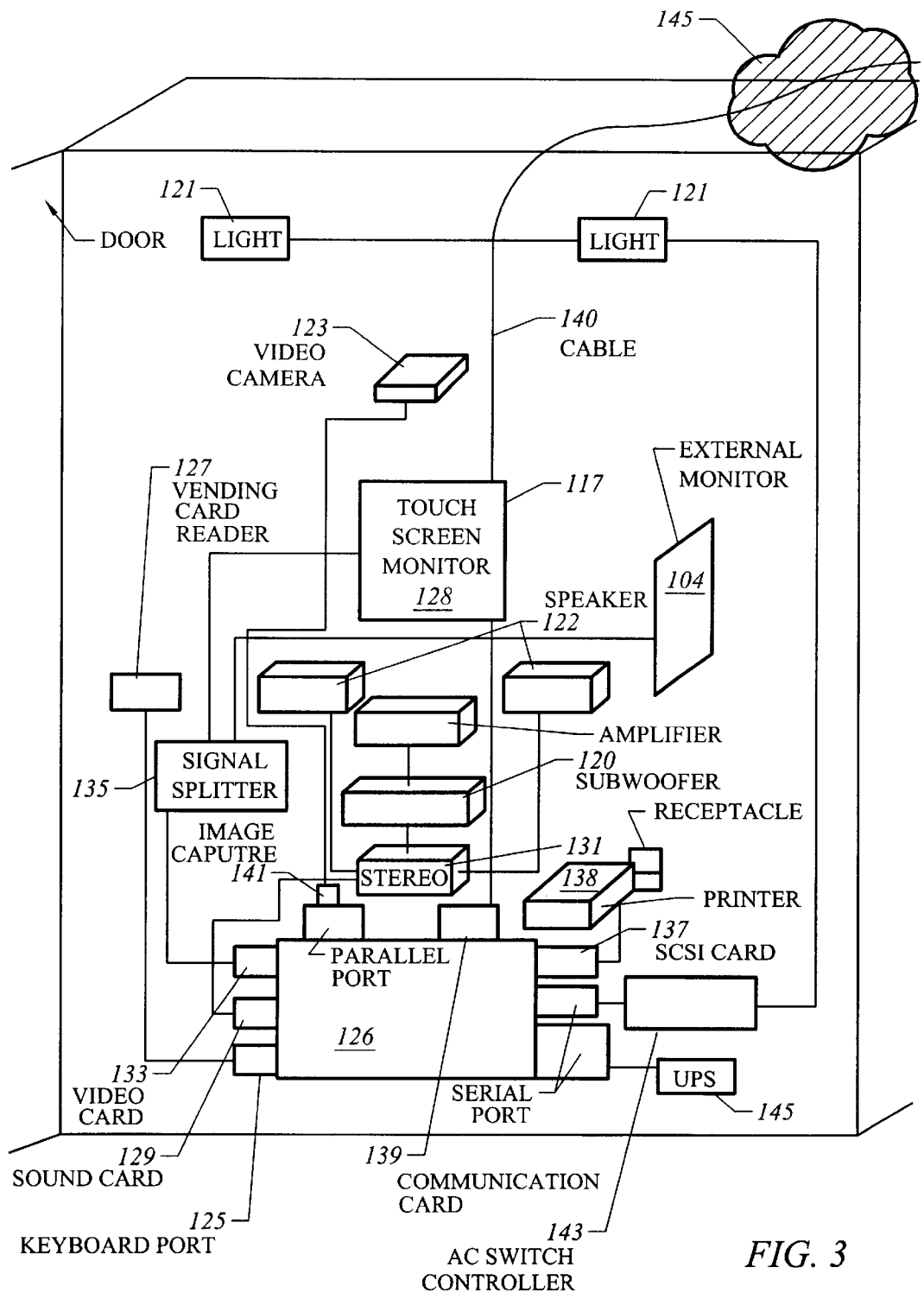
FIG. 3 shows a simplified side view of a booth with a door and hardware components revealed according to an embodiment of the present invention.

FIG. 3 shows a simplified side-view diagram of a booth according to an embodiment of the present invention. The side-view diagram illustrates a variety of functional blocks or elements which can be in the form of hardware or software or a combination of hardware and software. The side-view diagram is merely an illustration and should not limit the scope of the claims herein. One of ordinary skill in the art would recognize other variations, modifications, and alternatives. The booth can include a variety of elements such as a door that is opened. As shown, the elements are partly revealed. The booth includes a computer 126 or any type of central processing unit (i.e., CPU) or the like. The computer can also include any suitable microprocessor based unit such as an IBM PC-compatible system that has a microprocessor unit such as a Pentium™ chip manufactured by Intel Corporation of Santa Clara, Calif., or equivalent. The CPU is coupled to a variety of other elements such as a keyboard port 125, which is coupled or connect to a vending card reader 127 or other bill, coin, or token receptacle.

The CPU also connects to or is coupled to other input devices. The input devices can include command input devices suitable for accepting commands, for example, a touch screen 128, a writing tablet, a computer mouse, a joystick, a trackball, push-button(s) and/or knobs, a keypad, a keyboard, a speech-recognition or keyword spotting system (e.g., including microphone), an image or motion detection or recognition system (e.g., a text-, handwriting-, face-, sign-language, etc.-recognition system, etc.), and others. In the specific embodiment, the input device includes a touch screen 128 implemented on the display itself.

The CPU is also coupled to an audio output device such as a sound card 129, which is coupled or connected to a stereo receiver 131, which is coupled or connected to stereo speakers 122 and the stereo sub-woofer 120. The audio output device can also be coupled to one or more speakers, which can include sub-woofers and sub-sonic speakers, audio synthesizers, buzzers, bells, and others audio output means, depending on the particular configuration chosen. An amplifier 118 coupled to the stereo can also be included. The CPU is also coupled or connected to a video display card 133, which is coupled to or connected to a signal splitter 135, which is coupled to or connect to touch screen monitor and external monitor 104. The monitor or display can be any suitable computer-type display, for example, a cathode ray tube video display, a flat panel display (e.g., a liquid-crystal display), and others, depending on the particular configuration chosen. The display can also include or be supplemented with lights, indicator lights, strobe lights, LEDs, and the like. In a specific embodiment of the invention, the visual display is a computer-type display. Other types of output devices can include, among others, smoke emitters, smell emitters, seat mover/shakers, liquid or water spray devices, vibrators, wind machines, and the like.

The CPU also couples to or connects to a standard interface card as a SCSI card 137. SCSI card connects to or couples to an output device for hard copies such as, for example, a dye sublimation printer 138, whose output goes into the receptacle for photographs. In preferred embodiments, the CPU connects to or is coupled to a communication device 139 or network interface card, which connects to a transmitting and/or receiving device. The transmitting and/or receiving device can include either wireless or wired elements such as cable or a telephone line. Alternatively, the CPU connects to or is coupled through a modem and a phone line or cable to a wide area network of computers. As merely an example, the device can be a cable 140 which runs out of an upper region of the booth and plugs into a computer network or phone line provided by a venue or selected geographic location, e.g., theme park, mall, golf course, hotel, motel, store, business, gas station, airport, festivals, trade shows, cruise ships, train terminals, arcades, bars, clubs, and organizational meetings such as reunions and the like.

The CPU also couples to or connects to an image processing device 141. The image processing device can be, for example, a Snappy image capture device made by Play Inc. This image processing device couples to or connects to video camera 123, e.g., CCD camera. The camera is directed to or points to the user or users. The CPU also connects to or is coupled through a serial port to a switch controller 143, which can be an AC switch controller or the like. The switch couples through a serial port, parallel port, USB port, or other computer interface to a switch controller, which can selectively turned off and on the lights. The CPU also connects to or couples through a serial port, parallel port, USB port, or other computer interface to a switch controller to a UPS 145 (i.e., Uninterrupted Power Supply). An AC power supply (e.g., 120 Volt/60 Hertz) of the CPU also connects to or is coupled to the UPS.

The CPU also uses or is connected to attendant support chips, buses, and interfaces. The CPU also runs under the direction of software at least partially residing during runtime in a random access memory ("RAM"). The software also may reside in nonvolatile storage, such as a hard disk, flash memory, CD-ROM, DVD, removable disk memory, floppy disk, flash cards, and others. The storage device or devices also includes content for describing specific themes or experiences. These memory devices store can store the software features described throughout the present specification, as well as others.

The network interface card provides access to an external network 145, such as the Internet, using network protocols, for example TCP/IP, and others, depending on the particular network type. Network interfaces, as well as details for connecting with specific networks, such as local area networks, wide area networks, intranets, extranets, and the Internet, are generally conventional, but can be tailored for the specific application. A network server will receive captured data from the booth and the like at a remote location, for example.

Although the above description has generally been described in terms of hardware, the functionality of the above can be replaced by a combination of hardware and/or software. The hardware can also be further separated into other hardware and/or software elements. Additionally, the hardware can also be combined or integrated together as a single element, a module, or integrated circuit chip. Accordingly, the above descriptions should not limit the scope of the claims herein. One of ordinary skill in the art would recognize other variations, modifications, and alternatives.

Additionally, although the above diagrams show a booth that is totally enclosed, a variety of other types of booths can be used. As merely an example, the booth can be partially enclosed and does not include a bench, for example. In some embodiments, the present invention can also be implemented in a "standup kiosk" or even countertop models, as well as others. Additionally, the backside of the booth can be replaced with a movable or temporary screen or the like. Accordingly, the present booth as shown should not limit the scope of the claims herein. One of ordinary skill in the art would recognize other variations, modifications, and alternatives.

Figure 4:
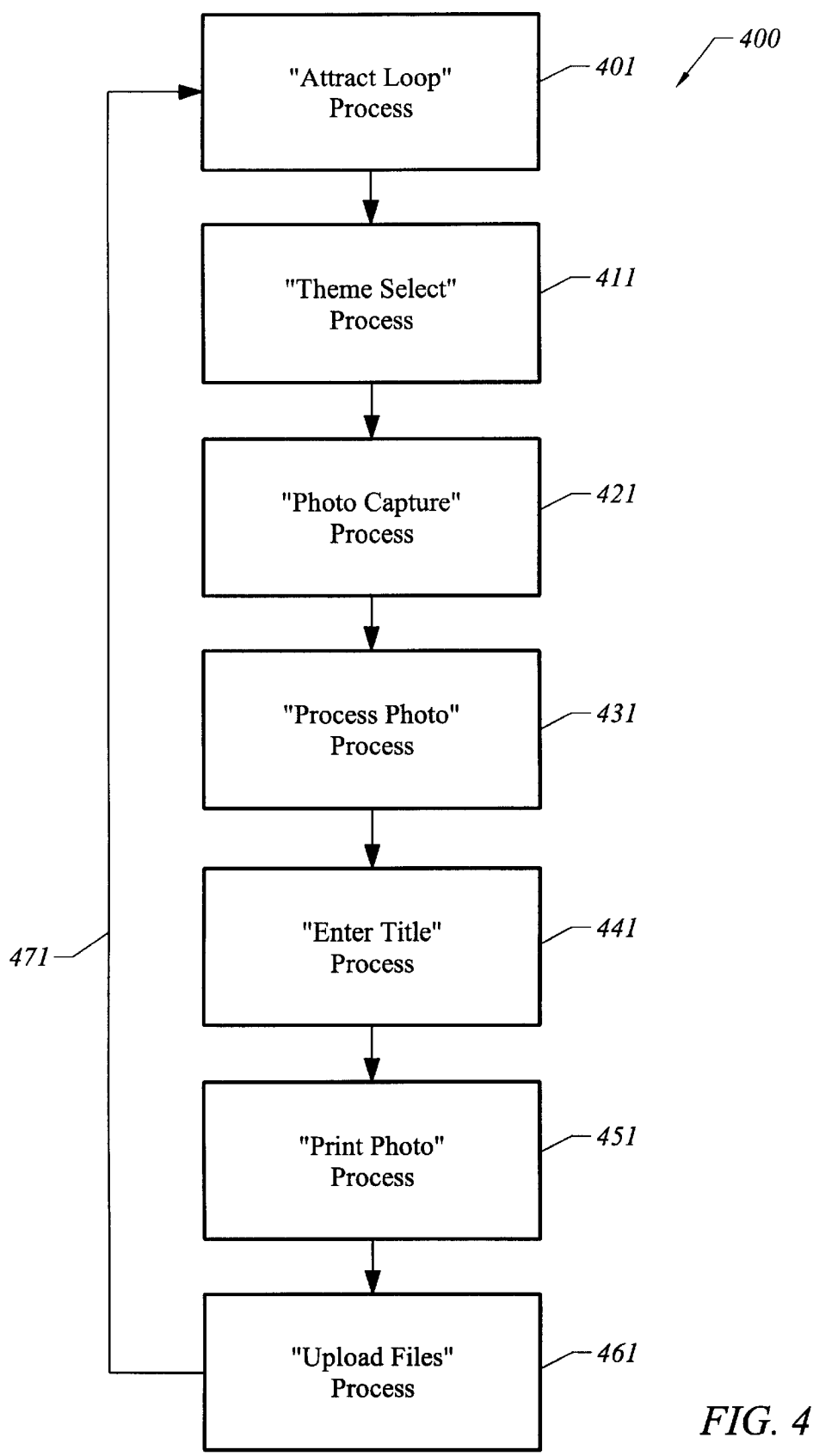
FIG. 4 is a simplified flow diagram of a general method according to an embodiment of the present invention.

FIG. 4 is a simplified flow diagram 400 of a general method according to an embodiment of the present invention. The flow diagram is merely and illustration and should not limit the scope of the claims herein. One of ordinary skill in the art would recognize other variations, alternatives, and modifications. The method can be implemented by way of computer software and/or hardware. The flow diagram 400 includes a variety of steps. The steps begin with one or more modules or process steps, which will be described in more detail below, but will be generally described as follows. In a specific embodiment, the present method uses an attract loop to lure or attract a user or users (i.e., customers) to a booth, such as the one in the above Figs. The attract loop (step 401) uses a monitor that outputs or displays a video and/or audio program, also called a "teaser," to demonstrate an operation and/or benefits of the present booth. The user approaches the booth, and if successful, steps inside the booth or in front of the interior display monitor. In some embodiments, the users also sits down on the bench inside the booth before carrying out the methods described herein as well as others.

Once inside the booth, the user selects a "theme" using a theme select process, step 411, according to a specific embodiment. In particular, the user sits in front of a user interface such as a touch screen on the display. The touch screen display prompts the user to insert a vending card or alike, which has been purchased from a venue owner. Alternatively, money such as bills or coins can be used. In some cases, tokens may also be used. Plastic cards such as credit or debit or ATM cards can be used. The user inserts the card. The touch screen displays a second montage, culminating in a screen which asks the user to choose a background theme or a selected number of background themes. The user selects a background theme by way of the touch screen.

In a specific embodiment, the method then captures the user's image in digital form, step 421. In a specific embodiment, the method captures one or more than one, such as three or more images, from the user. The images can be captured in combination with light bulb flashes, which are used to illuminate the user. Alternatively, the light bulb flashes can also provide a signal or indication to the user upon completion of the capturing process. The image of the user and background form the picture. The picture is displayed on the screen for user viewing. The user selects one or more of the pictures, which are provided on one or more themes or backgrounds. Selection occurs by way of the touch screen.

A process photo process (step 431) is performed according to a specific embodiment. The capture photo process uses image processing techniques to convert the picture into a usable graphical or information format. In a specific embodiment, the photo process converts the picture into a JPEG file for a web page on the World Wide Web or Internet. The present process also converts the picture into a bitmap file or picture (i.e., BMP) for outputting onto a hard copy. Accordingly, the selected image is converted into a web page file or a hard copy.

A title can be selected for the picture, as shown in step 441, according to an embodiment. Here, the user decides upon a title and enters a title for his/her picture using an alphanumeric display or keyboard displayed on the touch screen. Alternatively, the user may use a different interface device such as a standard keyboard for entering the title and other alphanumeric information.

In a specific embodiment, the present method uses a print photo process, step 451. The print photo process composes the picture into a photo along with the title and a selected address or Uniform Resource Location, i.e., URL. That is, the URL is created for the user. Additional information includes, among others, title, time, and location of booth such as venue, where the image has been acquired. Next, the process prints the picture with title and the URL text. The process also prints out a hard copy of the picture using, for example, a color printer or other output device. The picture can include a variety of features such as the title, the name of the venue where the booth is located, the background, address (e.g., URL), and other elements. The picture can also be in the form of stickers, which are multiple pictures. Alternatively, the picture can be in the form of a postcard, identification card, magnetic card (some sort of hard card like a blockbuster card that the use can take home and keep for a long time and that can even have a bar code on it) or the like. Alternatively, the URL can be printed without the picture on a thermal or "receipt" printer.

In a specific embodiment, the method also has a step of uploading (step 461) the information as files. The uploading process converts the title, URL, and other information into universal formats including, for example, HTML, JPEG, and a data file. The HTML file is permanently or temporarily stored onto a memory device such as a hard disk, which holds the HTML file. The data file is also stored in the memory device or other memory. The HTML, JPEG, and data file are uploaded onto, for example, a server or multiple servers. As merely an example, the server is a central server such as, for example, FotoZap.com server, but can be others. The server categorizes the files in specific locations or in a data base. The server is coupled to a wide area network of computers such as the internet, as well as other like networks. In some embodiments, the user can designate an e-mail address of a specific user including himself/herself, where the files are to be sent. The files, including HTML, JPEG, and data file, can be send to the e-mail address via uploading process according to an embodiment of the present invention.

The method returns from step 461 to the attract loop 401 process by way of branch 471. The flow diagram above merely shows a generalized sequence of steps according to an embodiment of the present invention. The flow diagram can also include additional steps. Additionally, the sequence of steps can be altered depending upon the application. Furthermore, the steps can be further combined or even separated depending upon the application. Selected details with regard to each of the steps, noted above, are show in references to the Figs. below.

Although the booth utilizes a video camera in a specific embodiment, alternative embodiments would include capturing video rather than stills from the users or customers. These live videos would be available for manipulation. The captured video would be uploaded to the Web page and/or transferred onto a VHS tape or digital video disco or some other physical medium available in the booth or other location. The image capture device could also be located in a kiosk or another publicly located space other than a booth. Additionally, the present booth can use an ink jet printer or any other kind or high speed photographic quality color printer could be used instead of a dye sublimation printer. In some embodiments, the present vending card reader could be replaced by a bill, coin, or token acceptor or a credit card or debit card reader. Furthermore, the present network connection cable could be replaced by a cable leading to a modem and a telephone.

Accordingly, the present flow diagram above merely shows a generalized sequence of steps according to an embodiment of the present invention. The flow diagram can also include additional steps as well as use other hardware elements. Additionally, the sequence of steps can be altered depending upon the application. Furthermore, the steps can be further combined or even separated depending upon the application. Selected details with regard to each of the steps, noted above, are described in the applications noted above, which are incorporated by reference herein, as noted above.

Figure 5:
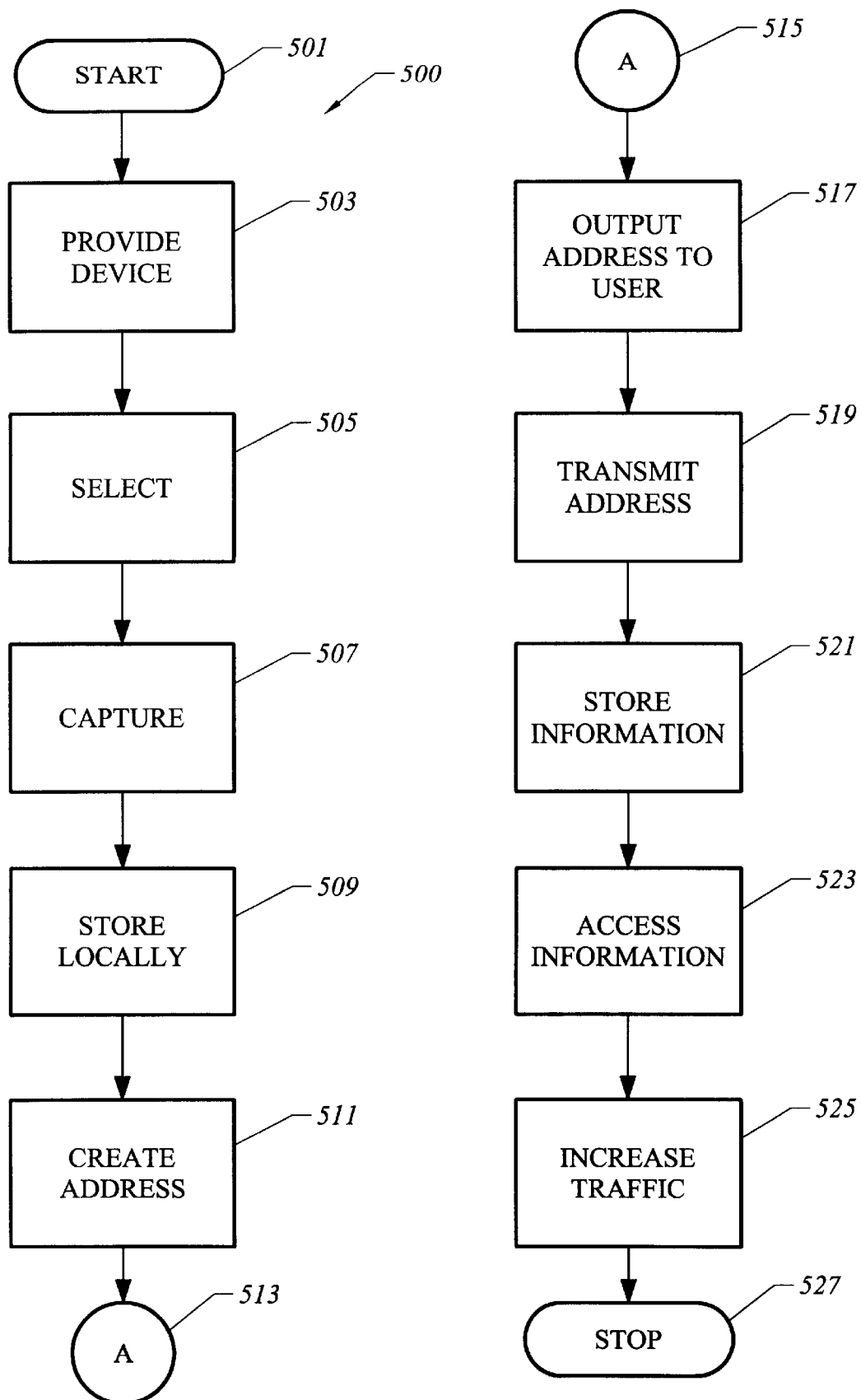
FIGS. 5–5C are simplified flow diagrams of methods according to embodiments of the present invention.
Figure 5A:
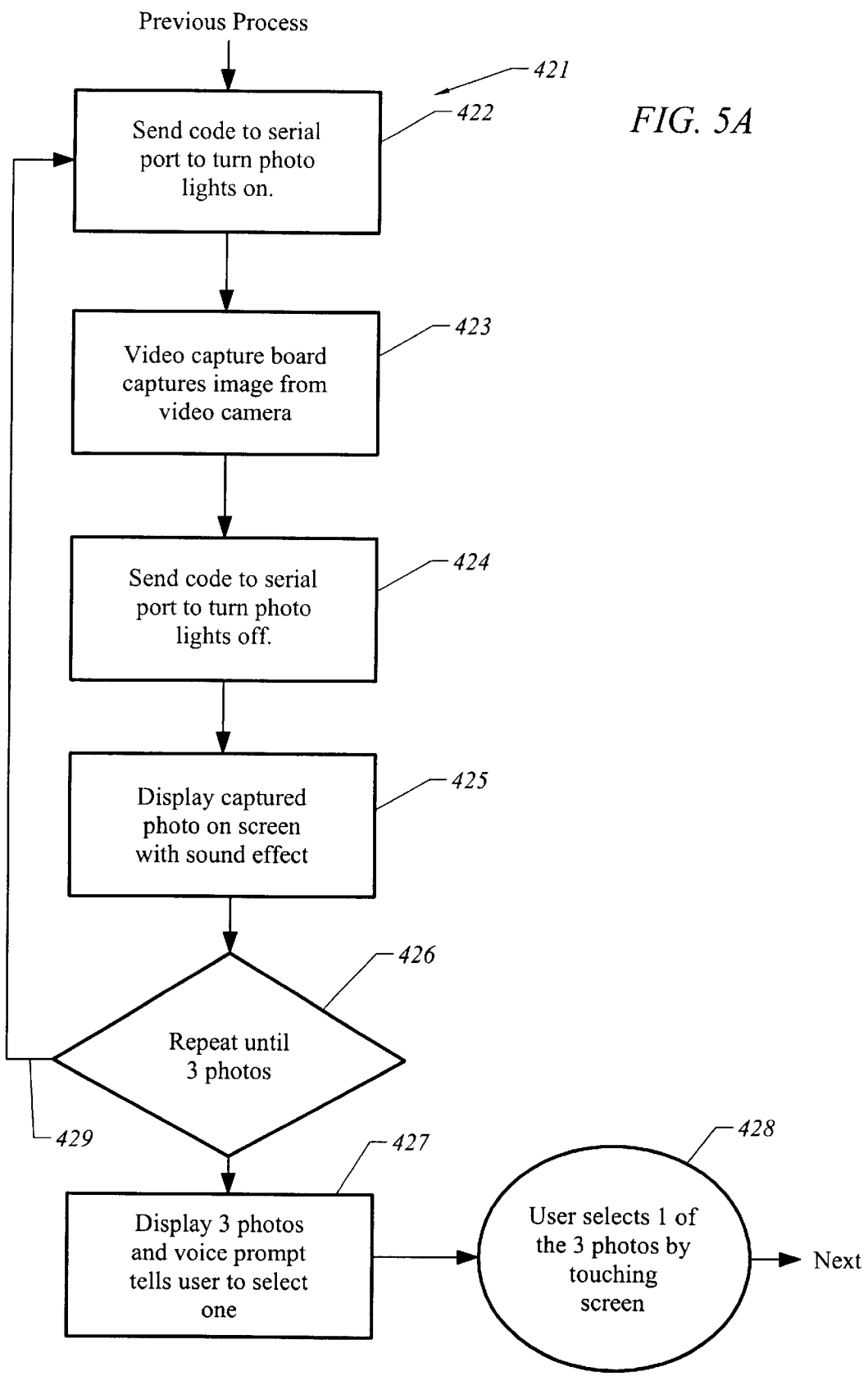
Figure 5B:
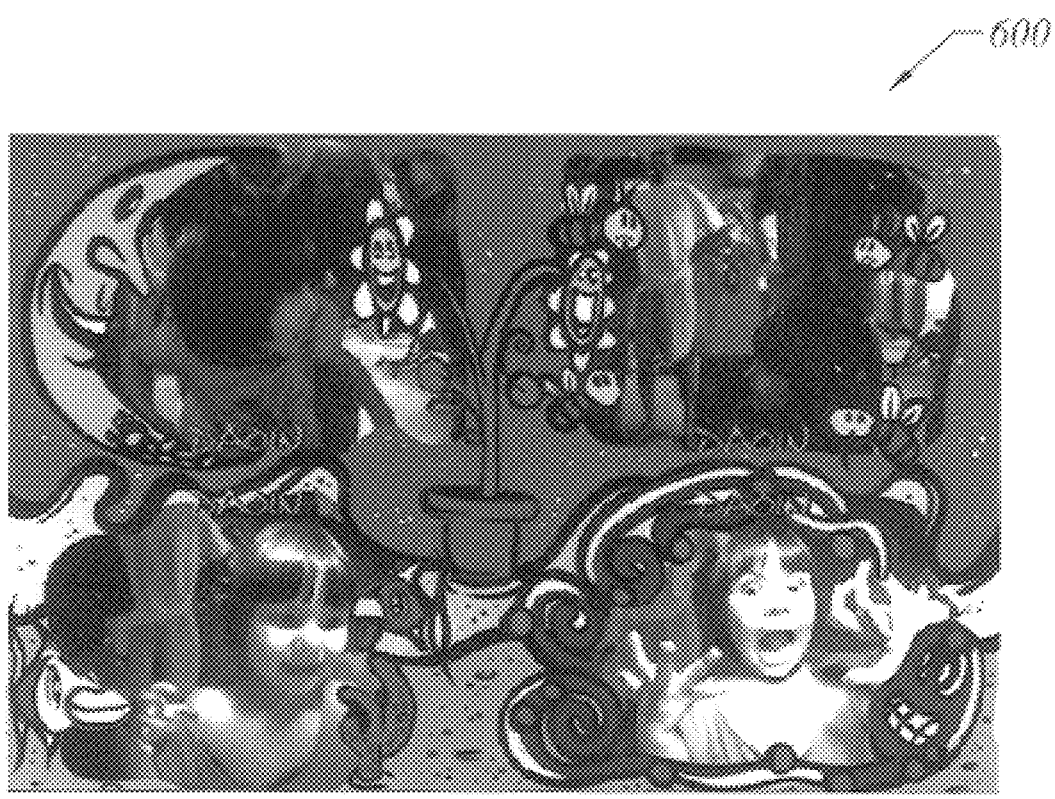
Figure 5C:
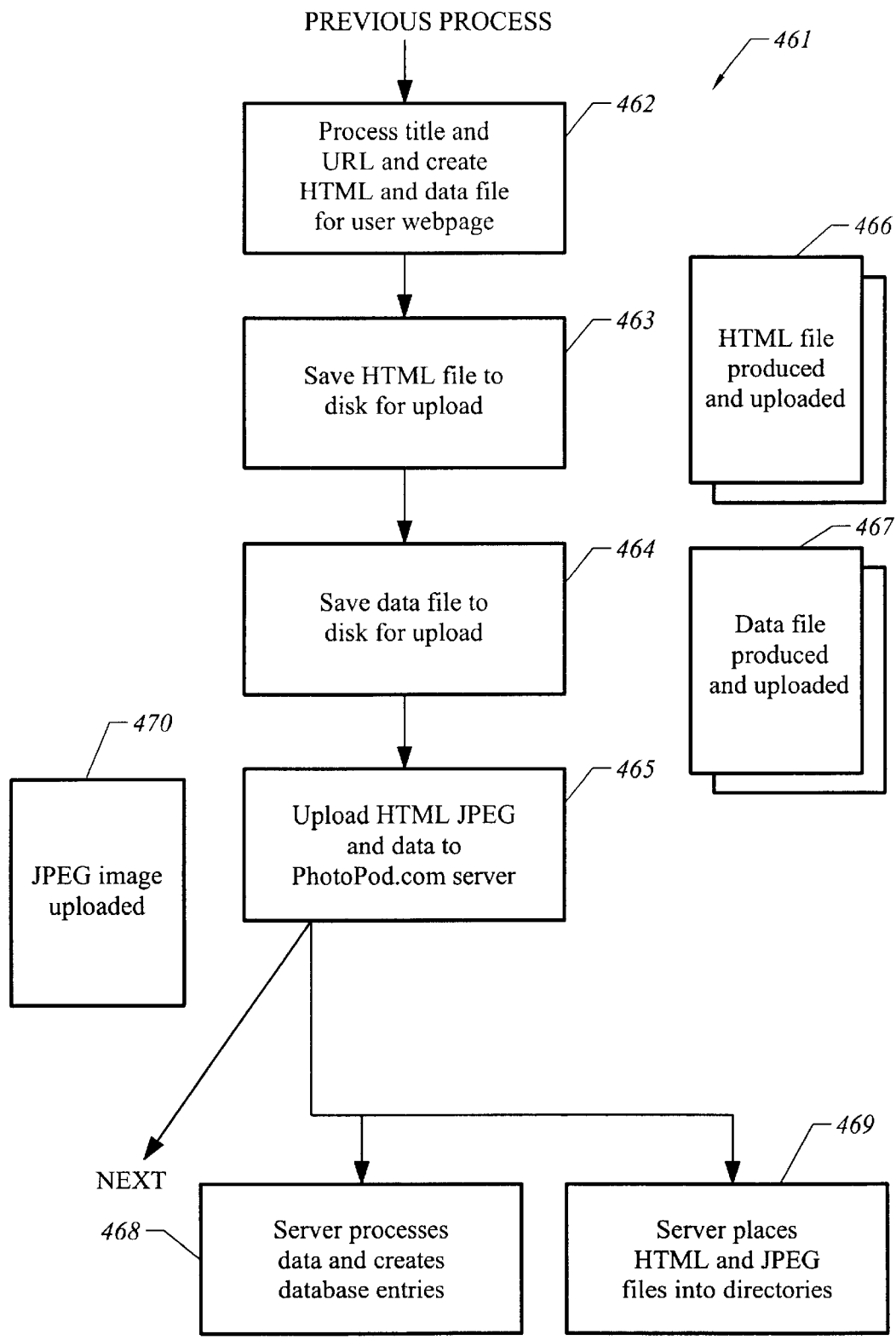

FIGS. 5–5C are simplified flow diagrams of methods according to embodiments of the present invention. These diagrams are merely examples and should not limit the scope of the claims herein. One of ordinary skill in the art would recognize other variations, modifications, and alternatives. In FIG. 5, the present method begins at start, step 501, which begins the present method for increasing traffic to an electronic messaging site. The electronic messaging site is located on one of a plurality of computers, which are networked to each other to form a world wide network of computers, for example. As merely an example, the present electronic messaging site can be a Web site on the Internet.

The present method provides a public image capturing and transmission device, step 503. The public image transmission device can be any suitable device, which is capable of capturing user information to be transmitted over a wide area network of computers. The device can be similar the one described herein as well as others. The public user device can be at a completely public location, a private location, or a semi-public location, depending upon the embodiment. In a preferred embodiment, the device is located geographically in a commercial area, including a commercial zoned area. The commercial zoned area should have suitable foot traffic with many people walking by the image transmission device. In one embodiment, the commercial area can be near a strip of stores, restaurants, entertainment facilities, and the like. Alternatively, commercial area can be an indoor mall, a theme park (e.g., Great America™, Disneyland™, Knotts Berry Farm™), which has heavy foot traffic. Alternatively, the commercial area can be a government location such as a museum, a concert hall, or other location which has much foot traffic. The foot traffic is preferably about 999 people per day or more or 99 people per day or more or 9 people per day or more. The public media device should also be within the commercial area or at least about 50 feet from the commercial area. In these embodiments, the public device is within and perhaps near a point of sale in a retail store.

One of the many people that walk past the device decides to use it to take a picture of himself or herself. The user enters the device, which can be in the form of a kiosk, or other form. The user stands in front of the display, which has a camera directed toward the user. In some embodiments, the camera is physically located above the display. Alternatively, the camera can be located below the display. Alternatively, the camera can be located on either side or both sides of the display. The device begins operation by providing a user menu where the user can select (step 505) one of a plurality of functions. Some of these functions include selecting a theme, playing a game, image capturing, sending e-mail messages, and others.

In a specific embodiment, the user selects a "theme" using a theme select process. In particular, the user sits in front of a user interface such as a touch screen on the display. The touch screen display prompts the user to insert a vending card or alike, which has been purchased from a venue owner. Alternatively, money such as bills or coins can be used. The user inserts the card. The touch screen displays a second montage, culminating in a screen which asks the user to choose a background theme or a selected number of background themes. The user selects a background theme by way of the touch screen.

Next, the camera captures an image of the user, step 507. Some details of the image capture step is provided by FIG. 5A, for example. The capture step is shown by a simplified flow diagram 421 according to an embodiment of the present invention. In a specific embodiment, the method then captures the user's image in digital form, step 421. In a specific embodiment, the method captures one or more than one, such as three or more images, from the user. In particular, the method sends via a processing unit a signal to a serial port to turn photo lights on, step 422. The images can be captured in combination with light bulb flashes, which are used to illuminate the user. Alternatively, the light bulb flashes can also provide a signal or indication to the user upon completion of the capturing process. The image of the user and background form the picture, which is captured by a camera, step 423. The camera is driven by a video capture board or the like. The picture is displayed (step 425) on the screen for user viewing. In some embodiments, the picture display also occurs with sound or other special influences. The process is repeated, step 426, for a selected number of times via branch 429. Once the desired number of processes are repeated, the selected number (e.g., three) of pictures are displayed on the monitor for viewing. The user selects (step 428) one or more of the pictures, which are provided on one or more themes or backgrounds. Selection occurs by way of the touch screen. The method goes to the next step.

Although the above has been described as capturing an image, other user information can also be acquired. For example, a capturing device can include, among others, a finger print capture device, a retinal scanning device, a voice capturing device, a signature capturing device, a voice capturing device and others. Other capturing devices include a voice capturing device such as a microphone and the like. The capturing device generally can capture one of a plurality of user characteristics that may identify the user. For example, the capturing device can capture a finger print, a retina image, a voice, a signature imprint, a facial expression, and other user information.

Once the user information is captured, it is stored (step 509) in a local drive, but is not limited. The local drive can be a hard disk drive, a tape, an integrated circuit, and other memory devices. The local drive stores the user information, which will be uploaded at a desirable time. Alternatively, the user information is simultaneously uploaded and does not need to be stored locally, depending upon the application.

The method creates an address for the user, step 511. The address can include a file name, or other unique characteristic. The address can be created at the device location or a remote server location. In one embodiment, the address is communicated to the user. As merely an example, the address is recited as follows:

Your Web page: http://www.fotozap.com/test/10310.html

In a specific embodiment, the method also creates a password, which password protects access to the address such as the one noted above. The password is communicated to the user. As merely an example, the address is recited as follows:

Save your Password: 2779user

The present method outputs (step 517) the address and password, if available (See connector reference letter "A" 513, 515). In a specific embodiment, the address and password are outputted to the user on the display, which is used to capture the image of the user. Alternatively, the address and the password are outputted on a hard copy of the image, such as the one in FIG. 5B, for example. As shown, the address and the password are printed as text underlying the image. Alternatively, they can be placed over the image or on the side of the image or other suitable location that does not substantially interfere with the image. In some embodiments, the address and the password are outputted to the Internet to an e-mail location of the user. Alternatively, the address and the password are outputted to any desirable person that the user selects. Here, the user selects a destination e-mail address where the user information, including image is to be delivered. The user receives the address and password at one of a plurality of computers, which are coupled to the wide area network of computers such as the Internet. Since the address and the password are permanently in writing, on the hard copy of the image or the user's e-mail, the user does not need to remember a long address, which may be easy to forget.

Next, the method transmits (step 519) the user information to a server through a wide area network of computers such as the Internet. Here, the method uplinks to the Internet via a telephone connection which can be a wired connection, a wireless connection, or the like. In a specific embodiment, a method for uploading a file process according to an embodiment of the present invention is included. FIG. 5C illustrates this method 461. In a specific embodiment, the method has a step of uploading (step 461) the information as files. The uploading process converts (step 462) the title, URL, and other information into universal formats including, for example, HTML, JPEG, and a data file. The HTML file is permanently or temporarily stored (step 463) onto a memory device such as a hard disk, which holds the HTML file 466. The data file is also stored (step 464) in the memory device or other memory. The HTML, JPEG 470, and data file are uploaded (step 465) onto, for example, a server or multiple servers. As merely an example, the server is a central server such as, for example, photozap.com server, but can be others. The server categorizes the files in specific locations such as directories (step 469) and/or in a data base (step 468) as entries. The server is coupled to a wide area network of computers such as the internet, as well as other like networks. A user of the network of computers can access the server to view the image, including the title and other information, which has been captured at the booth.

As noted, once the user information is sent to the server, the information is stored (step 521) on the server. In particular, the information is linked to the address, which was created, and stored in a memory storage device. The memory storage device can be any suitable memory unit such as a hard drive, a tape, a floppy drive, an integrated circuit, and others. The information can be stored at a single location, alternatively, it can be distributed. Of course, the manner of storage will depend upon the particular embodiment.

The user accesses (step 523) the user information by entering the address into a browser based Internet device, for example. The address is called by way of the browser, which prompts for a password. The user enters the password, which is on the hard copy and access the user information to be viewed or reviewed. Alternatively, other users that have the password can access the user information. Here, members of the family, business associates, or friends can access and user the information for communicating purposes. By way of the permanent address and password, traffic of the particular electronic messaging site, which has the user information, increases, step 525. Here, a variety of users or non-users may access the electronic messaging site. The present method stops, step 527.

Although the above has been generally described in terms of hardware and software, it will be recognized that other variations can exist. As merely an example, the functionality of the present invention can be further combined, or even separated, in terms of hardware. Alternatively, the functionality of the present invention can be further combined, or even separated, in terms of computer software or programs. Furthermore, the functionality of the present invention can be further combined, or even separated, in terms of a combination of computer software or programs and hardware. Accordingly, the above descriptions in terms of hardware and software are not intended to limit the scope of the claims herein.

Figure 6:
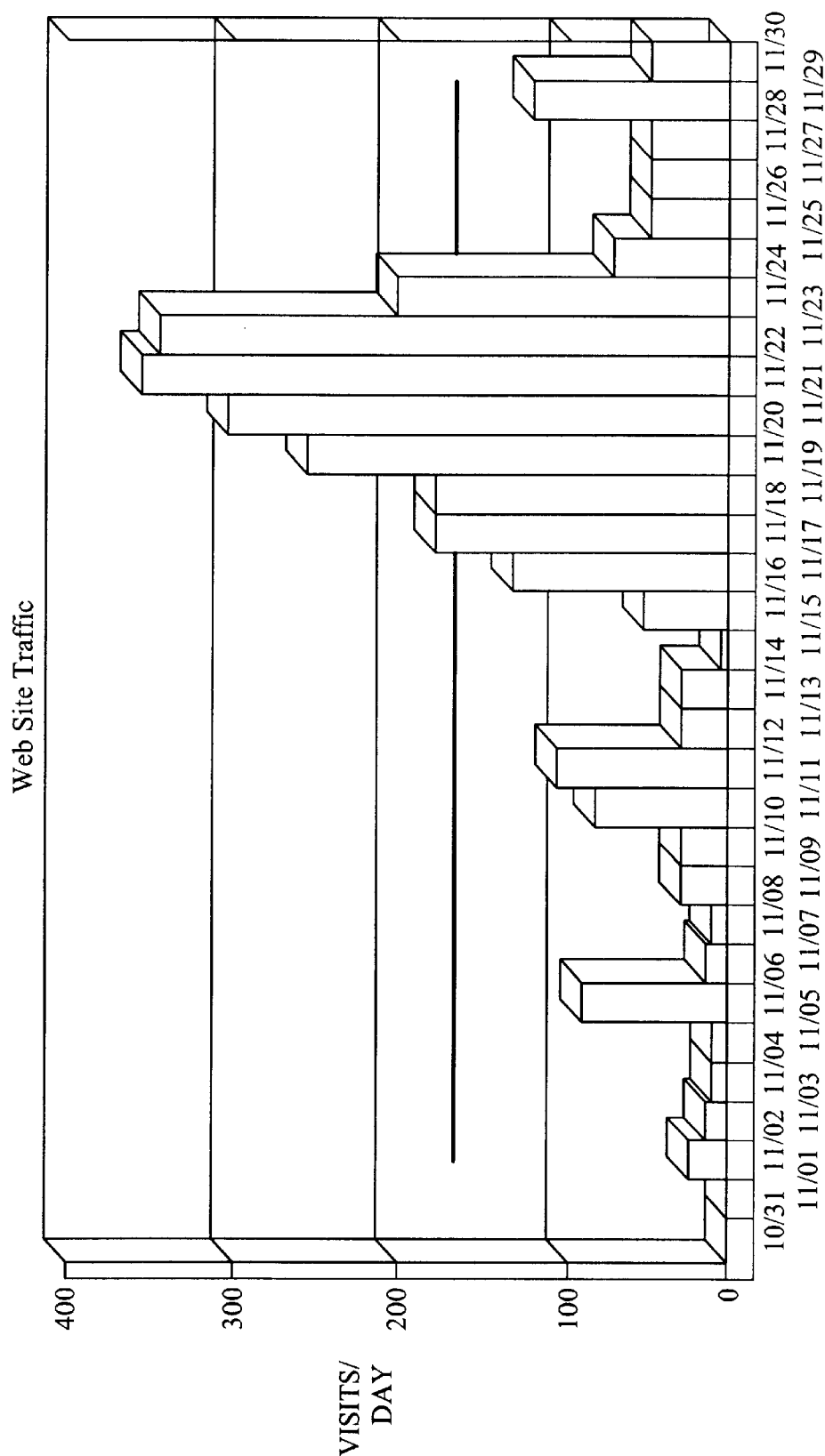
FIG. 6 is a simplified diagram experimental data according to an embodiment of the present invention

Experiments:

To prove the principle and operation of the present invention, we performed experiments. In these experiments, we compared a conventional Web site, which does not have any personalized information, against a Web site that uses the techniques described herein. The conventional Web site was constructed for everyone to view. In particular, the Web site that we evaluated was called "FotoZap.com". At the beginning of a first month, there were no kiosk uploads of images (e.g., personalized information) to the FotoZap.com site. The site generally received minimal traffic from testing from internal sources, as shown in FIG. 6. On the 18th–21$^{st}$ of the month, two kiosks were deployed at a major tradeshow. Pages including images of users created in the kiosks were uploaded to FotoZap.com.

In particular, users passed by the two kiosks. Based upon the physical traffic, users entered the kiosk. They carried out the operation of the kiosks, which included capturing images of the users and uploading the images to the FotoZap.com Web site. Now, photographs or images of the users were posted on the Web site. An increased traffic was seen immediately, as shown. Each use of the kiosk generated approximately 5 (five) visits to FotoZap.com in the following week. The kiosk deployment also had a lasting effect on FotoZap.com, with the baseline traffic rising from approximately 20 uses per day to approximately 55 uses per day as a result of the three day kiosk deployment. Similar results were achieved with a trial at other geographic locations, such as malls and tradeshows. For example, a second geographic location received a 5–10% increase in daily traffic as the result of a six week deployment of one kiosk. Accordingly, we believe that the present technique increases traffic on a Web site or any Web site using the present invention.

Other embodiments of the present invention and its individual components will become readily apparent to those skilled in the art from the foregoing detailed description. As will be realized, the invention is capable of other and different embodiments, and its several details are capable of modifications in various obvious respects, all without departing from the spirit and the scope of the present invention. As merely an example, the present method and booth can be implemented into a telephone network to create an internet telephone booth. The internet telephone booth can transmit and receive video and audio information from a selected e-mail location or phone number. Additionally, messages from the internet telephone booth can be left at selected web sites or even e-mail addresses or the like. Accordingly, the drawings and detailed description are to be regarded as illustrative in nature and not as restrictive. It is therefore not intended that the invention be limited except as indicated by the appended claims.

What is claimed is:

1. A method for increasing a quantity of users to an electronic on-line messaging site from off-line traffic, said method comprising:

capturing user information comprising a first image of a first user from a public media transmitting device, said public media transmitting device being coupled to a wide area network of computers and being located in an off-line location in a commercial area, the commercial area having off line traffic;

converting the user information comprising the first image into a file to be outputted through the wide area network of computers;

outputting the file to a first address location associated with the electronic on-line messaging site through said public media transmitting device;

outputting a document associated with the user information including the first image and a second address location on a printing device, the printing device being coupled to the public media transmitting device, whereupon the document includes at least the first image and the second address imprinted on the document; and accessing said first address location through one of said plurality of computers and repeating said accessing said first address location to increase a quantity of users to the electronic on-line messaging site whereupon the first address is associated with the second address.

2. The method of claim 1 wherein said capturing comprises an image capturing process of a facial expression of said user.

3. The method of claim 1 wherein said capturing comprises a voice capturing process of said user.

4. The method of claim 3 wherein said capturing is provided by a microphone.

5. The method of claim 1 wherein said capturing comprises capturing a physical user characteristic, said physical user characteristic being selected from a voice, a finger print, a retinal scan, a three dimensional scan, and a hologram.

6. The method of claim 1 wherein said public media transmitting device comprises a kiosk.

7. The method of claim 1 wherein said public media transmitting device is provided in a commercial area that is suitable for people to view and access the public media transmitting device.

8. The method of claim 6 wherein the commercial area is characterized by at least a traffic of 99 people per day.

9. The method of claim 6 wherein the commercial area is characterized by at least a traffic of 999 people per day.

10. The method of claim 1 wherein said electronic messaging site comprises an Internet Web site.

11. The method of claim 1 wherein said accessing said information is provided using a TCP/IP protocol.

12. The method of claim 1 wherein said accessing said information is provided using a browser.

13. The method of claim 11 wherein said browser is coupled to an operating system.

14. The method of claim 1 wherein said accessing said information is provided using a UDP protocol.

15. The method of claim 1 further comprising transmitting said user information over said network of computers to a server computer, said server computer storing said user information to be accessed through one of said plurality of computers.

16. A method for increasing a quantity of hits to a selected electronic messaging site, said method comprising:

capturing user information comprising a user image from a user through a public media transmitting device, said public media transmitting device being coupled to a wide area network of computers and being located at an off-line location having at least 99 people per day;

transferring from said public media transmitting device an electronic file associated with the user information to an address location corresponding to the selected electronic messaging site through the wide area network;

outputting a printed document including said user image and printed information corresponding to said address location through a printing device coupled to said public media transmitting device;

accessing said address location through one of said plurality of a computers whereupon the user based the accessing upon at least the printed document including the printed information corresponding to the address location; and increasing the quantity of hits on the selected electronic messaging site based upon at least the accessing of said address location through one of a plurality of computers.

17. The method of claim 16 wherein said accessing is provided by at least two computers that are coupled to said wide area network.

18. The method of claim 16 wherein said capturing comprises an image capturing process of a facial expression of said user.

19. The method of claim 18 wherein said printed document comprising a picture of said facial expression and a text of said address location imprinted on said printed document.

20. The method of claim 16 wherein said capturing comprises a voice capturing process of said user.

21. The method of claim 17 wherein said capturing is provided by a microphone.

22. The method of claim 16 wherein said capturing comprises a capturing process of a physical user characteristic, said physical user characteristic being selected from a voice, a finger print, a retinal scan, a three dimensional scan, and a hologram.

23. The method of claim 16 wherein said public media transmitting device comprises a kiosk.

24. The method of claim 16 wherein said public media transmitting device is provided in a commercial area that is suitable for people to view and access the public media transmitting device.

25. The method of claim 1 wherein the first address includes the second address.

* * * * *